US012143236B1

(12) United States Patent
Dhayapule et al.

(10) Patent No.: US 12,143,236 B1
(45) Date of Patent: Nov. 12, 2024

(54) WEB CONFERENCE RECORDING CONTENT MERGING

(71) Applicant: International Business Machines Corporation, Armonk, NY (US)

(72) Inventors: Raghavendra Rao Dhayapule, Bangalore (IN); Natesh H. Mariyappa, Bengaluru (IN); Shrinidhi Atmakur, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/490,355

(22) Filed: Oct. 19, 2023

(51) Int. Cl.
*H04L 12/18* (2006.01)
*H04L 65/752* (2022.01)

(52) U.S. Cl.
CPC ...... *H04L 12/1831* (2013.01); *H04L 12/1827* (2013.01); *H04L 65/752* (2022.05)

(58) Field of Classification Search
CPC ............. H04L 12/1831; H04L 12/1827; H04L 65/752; H04L 65/03
See application file for complete search history.

(56) References Cited

U.S. PATENT DOCUMENTS

| | | | |
|---|---|---|---|
| 6,426,948 B1 | 7/2002 | Bowman-Amuah | |
| 6,757,796 B1* | 6/2004 | Hofmann | H04N 21/23 709/225 |
| 7,084,898 B1 | 8/2006 | Firestone et al. | |
| 9,721,321 B1* | 8/2017 | Nayeri | G06F 16/283 |
| 10,554,719 B2 | 2/2020 | Stevens et al. | |
| 11,539,810 B1* | 12/2022 | Jaiswal | H04L 67/562 |
| 11,817,964 B1* | 11/2023 | Ayyagari | H04L 65/403 |
| 2006/0200520 A1* | 9/2006 | Vernon | H04L 65/1083 709/204 |
| 2007/0022159 A1* | 1/2007 | Zhu | H04L 12/1831 709/204 |
| 2008/0077671 A1* | 3/2008 | Rust | H04L 67/14 709/205 |
| 2010/0232579 A1* | 9/2010 | Hearn | H04L 67/568 379/202.01 |
| 2012/0296914 A1* | 11/2012 | Romanov | H04L 12/1831 707/E17.101 |
| 2014/0156854 A1* | 6/2014 | Gaetano, Jr. | H04L 65/1093 709/227 |

(Continued)

OTHER PUBLICATIONS

Anonymous, "Audio Capture and Replay After Conferencing Network Latency," an IP.com Prior Art Database Technical Disclosure, IP.com No. IPCOM000271510D, Dec. 27, 2022, 3 pgs.

(Continued)

*Primary Examiner* — Alina A Boutah
(74) *Attorney, Agent, or Firm* — Scott S. Dobson

(57) ABSTRACT

A system may generate a web conference recording of a live web conference among a plurality of participant computing systems. The system may receive, at the end of the live web conference, one or more local recordings from one or more participant computing systems of the plurality of participant computing systems. A system may merge content from the one or more local recordings into the web conference recording, the content from the one or more local recordings corresponding to one or more connectivity issues of a corresponding participant computing system during the live web conference.

8 Claims, 5 Drawing Sheets

(56) References Cited

U.S. PATENT DOCUMENTS

| | | | |
|---|---|---|---|
| 2015/0127782 A1* | 5/2015 | Qin | H04N 7/155 |
| | | | 709/219 |
| 2015/0378561 A1* | 12/2015 | Ollinger | G06Q 30/016 |
| | | | 707/769 |
| 2016/0057390 A1* | 2/2016 | Ramalho | H04L 65/4025 |
| | | | 348/14.08 |
| 2017/0131850 A1* | 5/2017 | Aggarwal | H04N 7/155 |
| 2019/0182384 A1* | 6/2019 | De Angelis | H04M 3/568 |
| 2021/0250195 A1 | 8/2021 | Baker | |
| 2023/0006850 A1* | 1/2023 | Liu | H04L 12/1827 |
| 2023/0068413 A1* | 3/2023 | Agrawal | G11B 20/10527 |
| 2023/0260516 A1* | 8/2023 | Kukde | H04N 7/155 |
| | | | 704/235 |
| 2023/0343360 A1* | 10/2023 | Singh | G10L 25/69 |

OTHER PUBLICATIONS

Brown, L., "How to Remove Silence from Video Automatically-Wondershare Filmora," https://filmora.wondershare.com/video-editing-tips/how-to-remove-silence-from-video.html, May 16, 2023, 7 pgs.

Brown, L., "Top 8 Video Silence Removers to Remove Silence from Video," https://filmora.wondershare.com/video-editing-tips/top-video-silence-remover.html, May 16, 2023, 7 pgs.

Mondal et al., "SureCall: Towards Glitch-Free Real-Time Audio/Video Conferencing," https://ieeexplore.ieee.org/abstract/document/5542727, Jun. 2010, downloaded Aug. 17, 2023, 9 pgs.

\* cited by examiner

WEB CONFERENCE RECORDING CONTENT MERGING

BACKGROUND

The present disclosure relates to web conference technology, and more specifically, to providing a recording of a web conference.

Web conferencing is a collaboration technology that enable users to communicate via an application over the internet. Users can conduct meetings and share presentations in a web conference. Multiple users join the web conference from multiple different locations.

SUMMARY

According to embodiments of the present disclosure, a computer-implemented method is provided including: generating a web conference recording of a live web conference among a plurality of participant computing systems; receiving, at the end of the live web conference, one or more local recordings from one or more participant computing systems of the plurality of participant computing systems; and merging content from the one or more local recordings into the web conference recording, the content from the one or more local recordings corresponding to one or more connectivity issues of a corresponding participant computing system during the live web conference.

According to further embodiments of the present disclosure, a system and computer program product for performing the method is provided.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
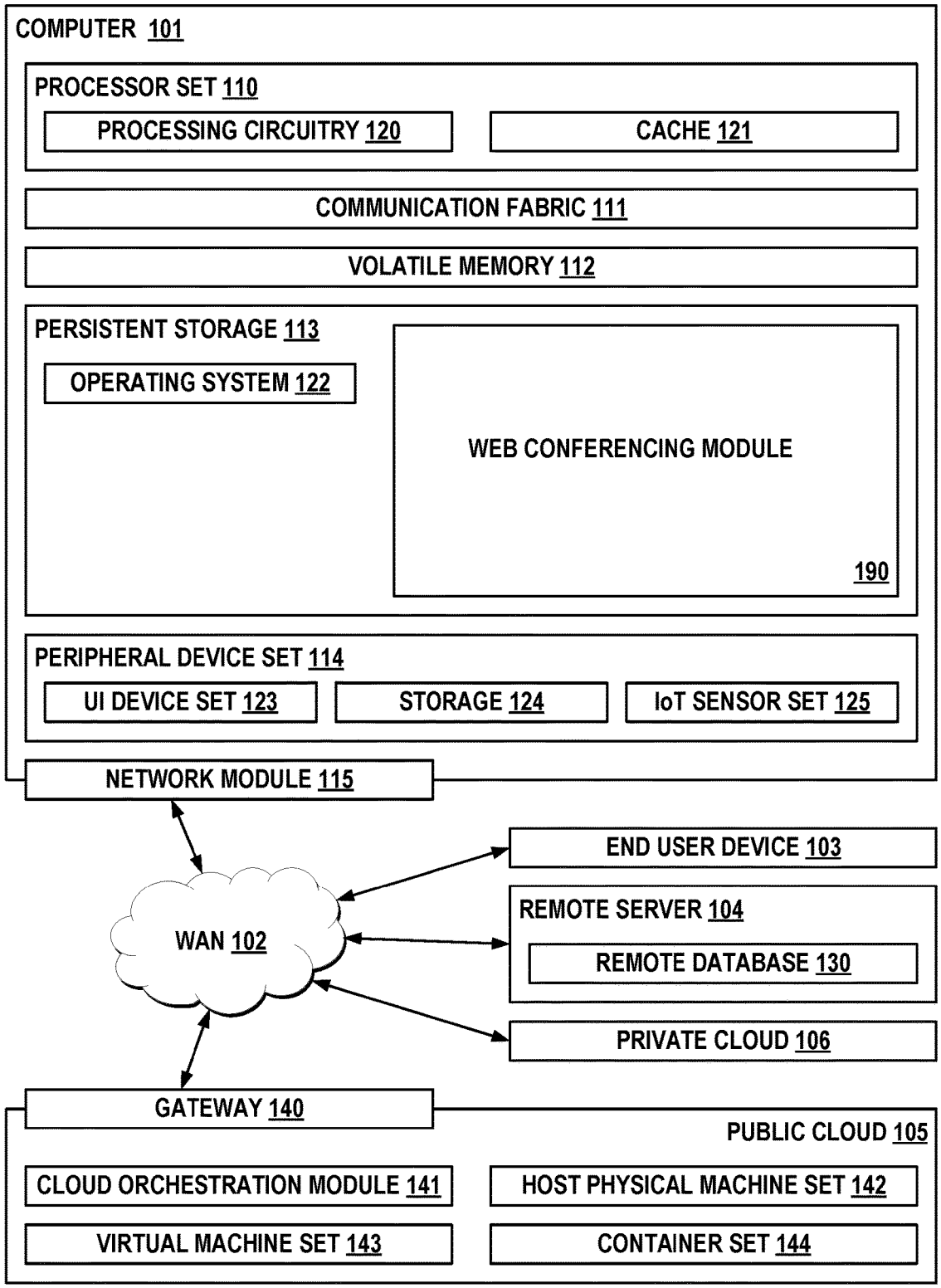
FIG. 1 depicts an example computing environment, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to web conference recording, and more particular aspects relate to merging content from one or more local recordings into a web conference recording based on connectivity issues. While the present disclosure is not necessarily limited to such applications, various aspects of the disclosure may be appreciated through a discussion of various examples using this context.

A web conference, as used herein, may be an online meeting among two or more participant computing systems communicating over one or more networks. Participants may share audio and/or video that is displayed to the other participants. For example, participants may share video of themselves via web cameras connected to their computing devices and audio of their voice from microphones connected to their computing devices. Additionally, participants may share additional content from their computing devices. For example, participants may share their computer screen or the display of a particular application, share an image or video, and/or share audio. Participants may communicate their content for the web conference to a web conference hub that combines and distributes the content to the other participants. The web conference hub may be located on a server, cloud computing system, participant computing system, or any other suitable computing system.

Each participant computing system may use web conferencing software configured to implement the web conference. The software may be configured to cause the participant computing system to connect to the web conference hub and enable communication to and from the web conference hub. The software may be downloaded and installed on the participant computing system or may be accessed remotely through a browser as a web application.

When participants of a web conference experience connectivity issues during the web conference, their content may not be transmitted to the web conference hub to be included in the web conference that is streamed to rest of the participants. For example, video from the participant's web camera may be blank and, if the participant is speaking, the other participants may be unable to hear the participant speaking. If the web conference is being recorded, the content that is not transmitted to the web conference hub will not be included in a recording of the web conference. Further, when a participant experiences connectivity issues, they may miss some of the web conference that is being streamed.

Embodiments of the present disclosure may provide for merging a participant's local recording with a web conference recording to improve the quality of the web conference recording when connectivity issues interfere with the transmission of the participant's content to the host during the web conference.

The web conference application may create a web conference recording of a web conference among participants. The web conference recording may be audio and video that combines the video and audio received from the participants during the web conference. For example, the web conference recording may include video from some or all of the participants web cameras and audio from some or all of the participants microphones. Additionally, the web conference recording may include additional content provided from participants such as shared computer screens or displays of a particular applications, shared images or videos, and/or shared audio.

During the web conference, the web conference hub may monitor connections with participant computing systems, identify connectivity issues with any of the participant computing systems, and maintain connectivity issue timing information. Connectivity issues may include, for example, a participant computing system becoming disconnected or the connectivity level of a participant computing system falling below a threshold level. The web conference hub may record the time that the connectivity issue started and identify the particular participant computing system associated with the connectivity issue. The web conference hub may further record the time when it determines that the connectivity issue has been resolved. Additionally, in some embodiments, the web conference hub may record the location of the particular participants video content in the web conference recording. This may include more than one location if the participant is sharing more than one video content. For example, web cam video of the participant may be included in one location of the web conference recording and screen sharing video may be included in a different location of the web conference recording. The locations may be identified using any suitable method. For example, screen coordinates may be used to identify the location of a video in the web conference recording. In some embodiments, the location of the participant's content in the web conference recording may change. In these embodiments, the web conference hub may further record the location change and timing of the location change when it occurs during a connectivity issue associated with the corresponding participant computing system.

During the web conference, the participant computing systems may record the participant's content (e.g., audio and video) locally during the web conference. Local web conference software installed on the participant's computing device may be configured to record the content locally that is to be communicated to the web conference hub, including, for example, web camera video, microphone audio, and/or other shared audio/video. This allows for a copy of the participant's content to be saved even if the content does not get communicated to the web conference hub due to a connectivity issue. In some embodiments, the local recording does not include content that was not intended to be part of the web conference. For example, the local web conference software may include the ability to mute the participant's audio or not share the video from the participant's web camera. If the participant's audio is muted, the audio may not be part of the local recording. If the participant is not sharing their video from their web camera, the video may not be part of the local recording.

The local recording may be encrypted for security. In some embodiments, the local recording is encrypted using an encryption key determined by the web conference software for use during the particular web conference. The recording may be encrypted, for example, using an Advanced Encryption Standard (AES) algorithm.

At the end of the web conference, participant computing systems may communicate their local recordings to the web conference hub. Local software on each of the participant computing systems may be configured to communicate their respective local recording to the web conference hub automatically at the end of the web conference. Alternatively, the web conference hub may request the local recording from participant computing systems. The local recordings may be communicated to the web conference hub in an encrypted form. After sharing the local recording with the web conference hub, the local recording may be deleted on the participant computing system.

The web conference hub may use the connectivity issue timing information and the local recordings to improve the quality of the web conference recording. The web conference hub may use a portion of the local recording of a participant computing system corresponding to the time period between the start and end time of a connectivity issue corresponding to the participant computing system and merge the portion with the web conference recording corresponding to the same period of time. The portion of the local recording may include audio and/or video. In some embodiments, the local recording may include multiple, separate, video and/or audio streams.

As mentioned above, in some embodiments, the web conference hub further maintains location information for the participant computing system's video content in the web conference recording. The web conference hub may use this location information to merge the participant computing system's video content into the video of the web conference recording. The location corresponding to the participant computing system's video content in the web conference recording may be blank during the time period of a connectivity issue for the participant computing system prior to merging the portion of the local recording.

The video portion of the local recording may be merged with the web conference recording using video overlay, where the portion of local recording is superimposed on top of the video in the web conference recording. The video content of the local recording may be placed in the web conference recording based on the location information maintained by the web conference hub. The audio of the local recording may also be overlayed on the audio of the web conference recording.

Below is an example algorithm for performing video overlay using network disconnect/reconnect timing information, according to some embodiments:

Input: A List, UserNetworkDisconectInfo, containing network disconnect/reconnect timing information, the user's screen coordinates at the time of disconnection, and the local recorded videos during the network disconnect.
Output: A video with all of the local recordings (video and audio) superimposed on top of the original recorded video at the specified screen coordinates.
Method: OverlayDisconnectedRecording ( ) {
　For each network disconnection in the UserNetworkDisconectInfo list:
　Invoke the multimedia libraries to overlay the local recording with the recorded timing information and screen coordinates.
}

The following provides a specific example, according to embodiments. User A disconnects at 6:00 of the web conference and reconnects at 6:10 while User A's video is at the screen coordinates (100, 200) in the web conference recording. User B disconnects at 6:05 and reconnects at 6:20 with the screen coordinates (800, 900). The web conference hub takes the portion of the local recording from User A's computing system corresponding to the time period 6:00-6:10 and superimposes the video onto the web conference recording at screen coordinates (100, 200) and overlays the audio at the time period 6:00-6:10. Further, the web conference hub takes the portion of the local recording from User B's computing system corresponding to the time period 6:05-6:20 and superimposes the video onto the web conference recording at screen coordinates (800, 900) and overlays the audio at the time period 6:05-6:20.

According to further embodiments of the present disclosure, the web conference hub may stream a recording of the web conference to a participant computing system after a connectivity issue is resolved. As noted above, the web conference hub may record the time a network connectivity issue started for a participant computing system. In some embodiments, identifying a network connectivity issue may initiate a recording by the web conference hub. When the network connectivity issue is resolved, the web conference hub may stream a playback the recording of the web conference to the participant computing system, starting at the time the network connectivity issue was identified. The playback of the web conference may be streamed a speed faster than normal such that the stream catches up with the live web conference. In some embodiments, the speed of the playback may be determined based on the length of the network connectivity issue, such that the playback may be faster for a longer connectivity issue. Once the playback has caught up to the live web conference, the web conference hub may return to streaming the live web conference to the participant computing system.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as web conferencing module 190. In addition to block 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105.

The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
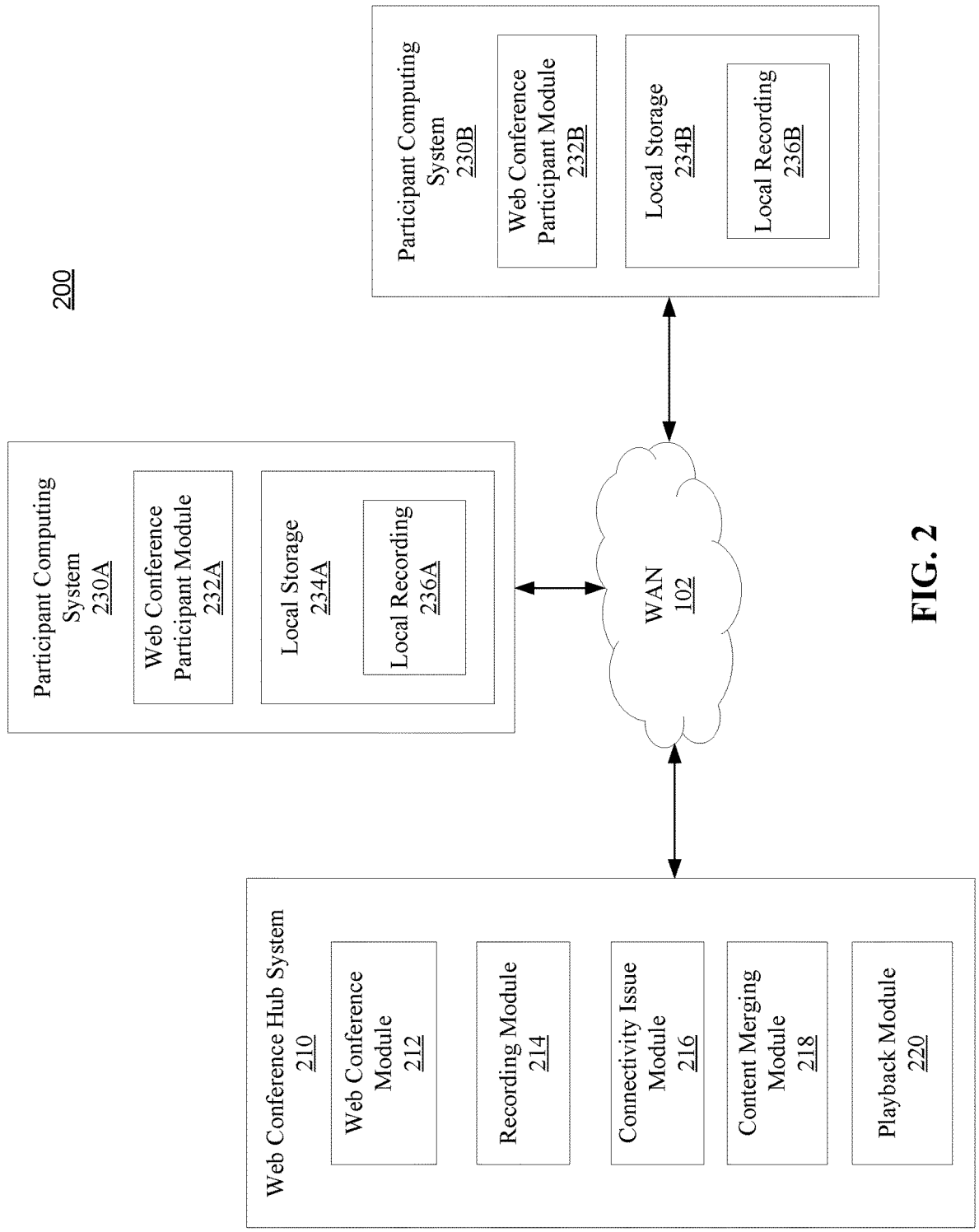
FIG. 2 depicts a block diagram of an example computing environment for performing web conference recording content merging, according to embodiments.

Referring now to FIG. 2, a block diagram of an example computing environment 200 for performing web conference recording content merging is depicted, according to embodiments. Computing environment 200 includes web conference hub 210, participant computing system 230A and participant computing system 230B. While only two participant computing systems are depicted, any number of participant computing systems may be included in embodiments. Further, while web conference hub system 210 is depicted as a separate system, in some embodiments, web conference hub system 210 may be part of one of the participant computing systems. Web conference hub 210 and participant computing systems 230A-B may be implemented in any suitable computing system, such as computer 101 described in reference to FIG. 1.

Web conference hub system 210 includes web conference module 212, recording module, 214, connectivity module 216, content merging module 218, and playback module 220. Web conference module 212 may be configured to implement a web conference among participant computing systems such as participant computing systems 230A-B. For example, web conference module 212 may receive audio/video from participant computing systems 230A-B, combine the audio/video to stream back to the participant computing systems 230A-B. Recording module 214 may be configured to generate a recording of the web conference. Connectivity issue module 216 may be configured to monitor the connectivity of participant computing systems 230A-B and maintain connectivity issue timing information and corresponding video location information. Content merging module 218 may be configured to receive the local recordings 236A-B from participant computing systems 230A-B and merge the content with the web conference recording based on the connectivity issue timing information and video location information. Playback module 220 may be configured to stream a playback of the web conference recording to a participant computing system in respond to an identified connectivity issue being resolved.

Participant computing system 230A includes web conference participant module 232A and local storage 234A. Web conference participant module 232A may be configured to implement the web conference in conjunction with web conference hub system 210. For example, web conference participant module 232A may be configured to communication audio/video to web conference hub system 210 to be included in the web conference and receive a stream of the live web conference from web conference hub system 210. Web conference participant module 232A may be further configured to generate local recording 236A in local storage 234A during a web conference. Web conference participant module 232A may further be configured to receive a playback of the recorded web conference from web conference hub system 210 in response to a connectivity issue being resolved.

Participant computing system 230B includes web conference participant module 232B and local storage 234B. Web conference participant module 232B may be configured to implement the web conference in conjunction with web conference hub system 210. For example, web conference participant module 232B may be configured to communication audio/video to web conference hub system 210 to be included in the web conference and receive a stream of the live web conference from web conference hub system 210. Web conference participant module 232B may be further configured to generate local recording 236B in local storage 234B during a web conference. Web conference participant module 232B may further be configured to receive a playback of the recorded web conference from web conference hub system 210 in response to a connectivity issue being resolved.

Figure 3:
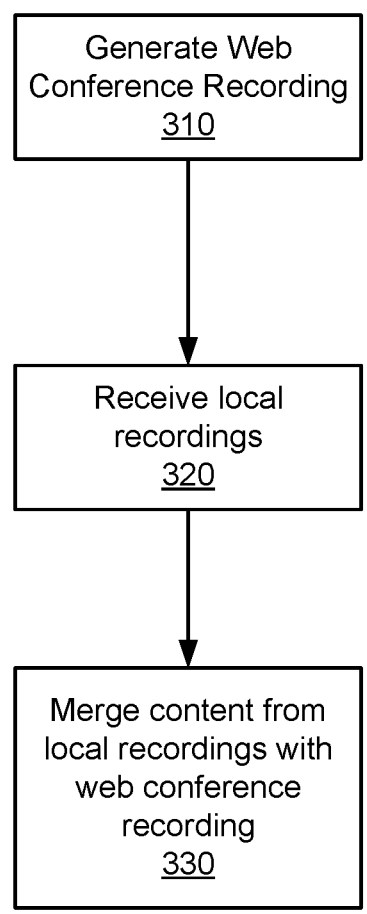
FIG. 3 depicts a flow chart of an example method for performing web conference recording content merging, according to embodiments.

Referring now to FIG. 3, a flow chart of an example method 300 for performing web conference recording content merging is depicted, according to embodiments. Method 300 may be performed by a web conference hub computing system.

At operation 310, the web conference hub generates a web conference recording. The web conference hub may be configured to record the combined video and audio from various participants of the web conference. The recording may be initiated in response to receiving a request from a host participant computing system.

At operation 320, the web conference hub receives one or more local recordings from one or more participant computing systems. In some embodiments, web conference software on the participant computing systems is configured to communicate the local recording to the web conference hub at the conclusion of the web conference. In some embodiments, the web conference hub is configured to request the local recordings from the participant computing systems at the conclusion of the web conference.

At operation 330, the web conference hub merges content from the one or more local recordings into the web conference recording, where the content from the one or more local recordings corresponds to one or more connectivity issues of a corresponding participant computing system during the live web conference. The web conference hub may overlay video from one or more local recordings onto the web conference recording based on the timing of identified connectivity issues during the live web conference recording.

Figure 4:
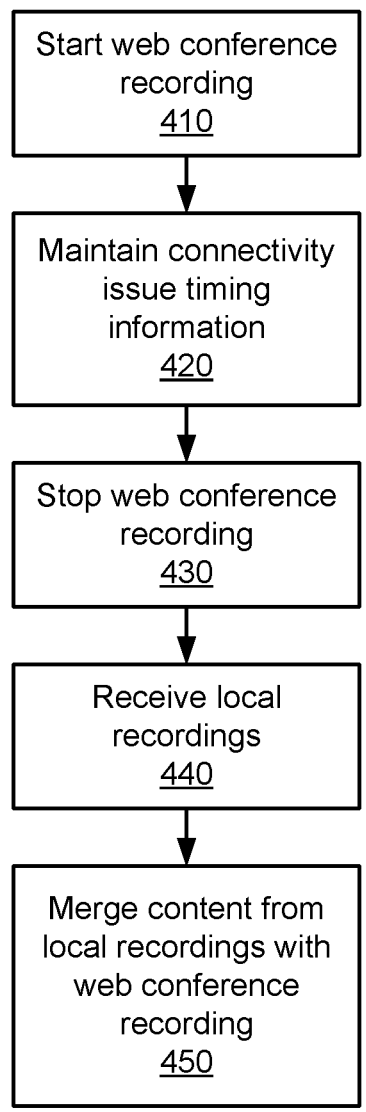
FIG. 4 depicts a flow chart of another example method for performing web conference recording content merging, according to embodiments.

Referring now to FIG. 4, a flow chart of another example method 400 for performing web conference recording content merging is depicted, according to embodiments. Method 400 may be performed by a web conference hub computing system.

At operation 410, the web conference hub starts recording the web conference. In some embodiments, the recording may start in response to receiving a request to record the web conference from a host participant computing system.

At operation 420, the web conference hub maintains connectivity issue timing information for participants in the web conference. In some embodiments, a connectivity issue is a participant computing system becoming disconnected from the web conference hub. In some embodiments, a connectivity issue may be an identified connectivity level falling below a predetermined threshold value.

At operation 430, the web conference hub stops recording the web conference. In some embodiments, the recording may be stopped in response to receiving a request to stop the recording from a host participant computing system. In some embodiments, the recording may be stopped in response to the web conference ending.

At operation 440, the web conference hub receives local recordings from one or more participant computing systems. In some embodiments, web conference software on the participant computing systems is configured to communicate the local recording to the web conference hub at the conclusion of the web conference. In some embodiments, the web conference hub is configured to request the local recordings from the participant computing systems at the conclusion of the web conference.

At operation 450, the web conference hub merges content from the local recordings with the web conference recording based on the connectivity issue timing information. For example, the web conference hub identify a period of time corresponding to a connectivity issue for a first participant computing system and overlay the content from the local recording from the first computing system onto the web conference recording.

Figure 5:
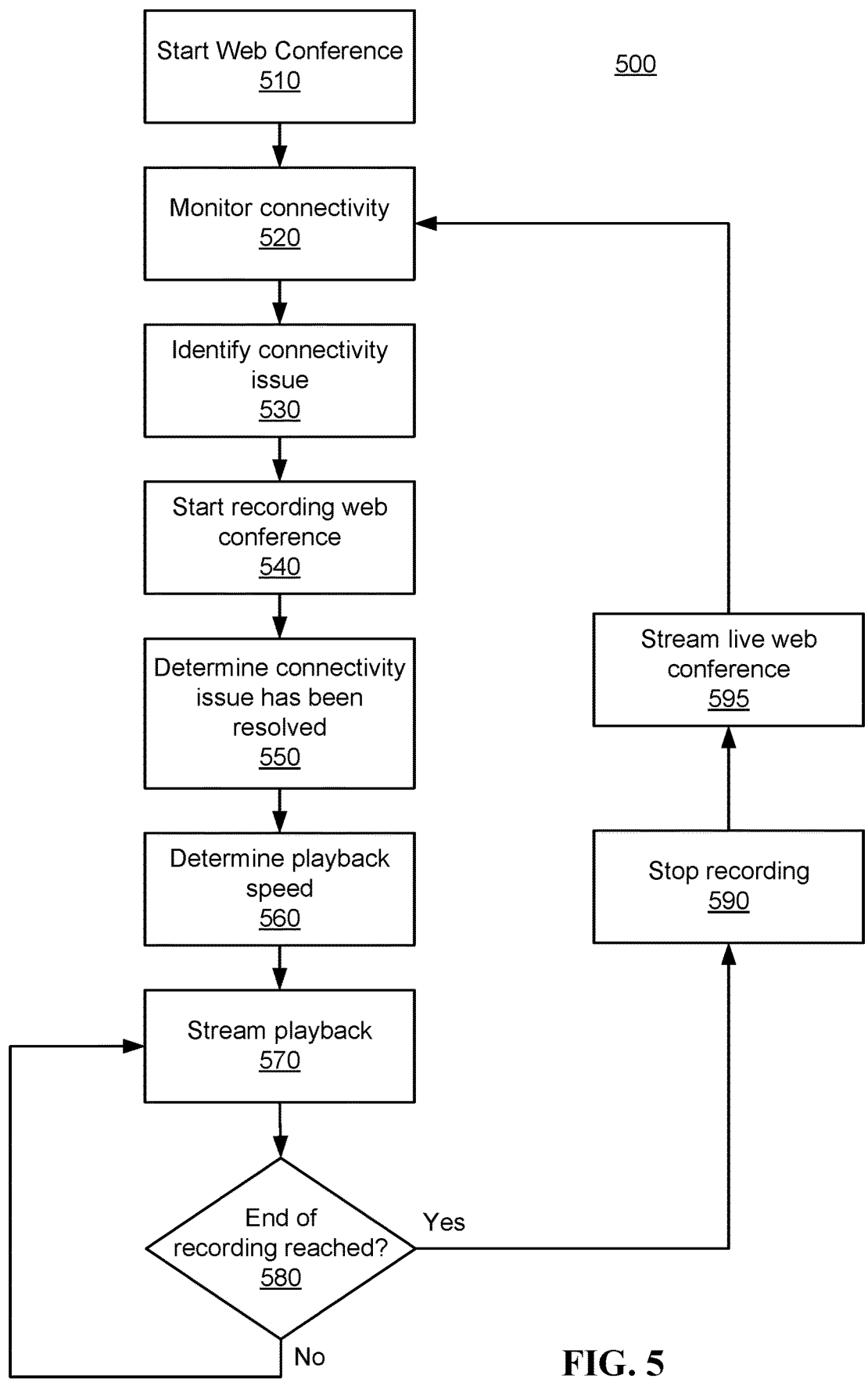
FIG. 5 depicts a flow chart of an example method for providing playback to a participant in response to a connectivity issue, according to embodiments.

Referring now to FIG. 5, a flow chart of an example method for providing playback to a participant in response to a connectivity issue is depicted, according to embodiments. Method 500 may be performed by a web conference hub computing system.

At operation 510, the web conference hub starts the web conference. The web conference hub may be connected to a plurality of participant computing systems to receive audio/video and combine the audio/video into a web conference that is streamed back to the plurality of participant computing systems.

At operation 520, the web conference hub monitors the connectivity of participant computing systems. In some embodiments, the web conference hub monitors for participant computing systems becoming disconnected from the web conference hub. In some embodiments, the web conference hub may monitor for connectivity issues that impact the quality of the connection that is not a full disconnection.

At operation 530, the web conference hub identifies a connectivity issue for a participant computing system. In some embodiments, the connectivity issue may be the participant computing system becoming disconnected from the web conference hub. In some embodiments, the connectivity issue may be a determination that the connectivity level of the participant computing system has dropped below a predetermined threshold level.

At operation 540, the web conference hub starts recording the web conference in response to identifying the connectivity issue. In some embodiments, if the web conference is already being recorded, the web conference hub may skip operation 540.

At operation 550, the web conference hub determines that the connectivity issue has been resolved. For example, the web conference hub may determine that the associated participant computing system has reconnected to the web conference hub or that the connectivity level is now exceeding the threshold level.

At operation 560, the web conference hub determines a playback speed for streaming a playback of the web conference recording. The playback speed may be faster than normal speed to allow the participant to catch up to the live web conference. In some embodiments, the playback speed may be based on the length of time of the connectivity issue. For example, the playback speed may be faster for a longer connectivity issue so that the participant can catch up to the live web conference faster.

At operation 570, the web conference hub streams the playback of the web conference recording to the participant computing system associated with the connectivity issue, starting at the time of the connectivity issue, at the determined playback speed.

At operation 580, the web conference hub determines whether the end of the recording has been reached when streaming the playback of the web conference recording. The recording may continue to get longer as the live web conference continues to be recorded while the playback is streaming. If the end of the recording has not been reached, the web conference hub may continue to stream the playback, per operation 570.

If the playback has reached the end of the recording, the web conference hub may stop recording the web conference at operation 590. In some embodiments, the web conference hub may skip operation 590 and will not stop recording if the web conference was already being recorded prior to identifying the connectivity issue (e.g., when the conference is being recorded for replay after the conference).

At operation 595, the live web conference is streamed to the participant computing system such that the participant computing system receives the same live web conference as the other participant computing systems. The web conference hub then continues to monitor connectivity of the participant computing systems per operation 520, although, in some embodiments, the web conference hub may continue to monitor connectivity for the other participant computing systems throughout operations 530-595.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
generating a web conference recording of a live web conference among a plurality of participant computing systems;
identifying a first connectivity issue for a first participant computing system during the live web conference;
in response to determining that the first connectivity issue has been resolved, streaming a playback of the web conference recorded during a period corresponding to the connectivity issue to the first participant computing system until caught up to the live web conference, the playback streamed at a speed faster than normal;
in response to the playback catching up to the live web conference, streaming the live web conference;
receiving, at the end of the live web conference, one or more local recordings from one or more participant computing systems of the plurality of participant computing systems; and
merging content from the one or more local recordings into the web conference recording, the content from the one or more local recordings corresponding to one or more connectivity issues of a corresponding participant computing system during the live web conference.

2. The method of claim 1, further comprising:
maintaining connectivity issue timing information and corresponding participant computing system during the live web conference, wherein merging content from the one or more local recordings in the web conference recording comprises placing content from the one or more local recordings over content in the web conference recording based on the connectivity issue timing information.

3. The method of claim 2, wherein maintaining connectivity issue timing information and corresponding participant computing system comprises:
in response to identifying first connectivity issue for the first participant computing system, storing a first time of identifying the first connectivity issue and associating the first time with the first participant computing system; and
in response to identifying that the first connectivity issue has been resolved, storing a second time of identifying that the first connectivity issue has been resolved and associating the second time with the first time and the first participant computing system, wherein placing content from the one or more local recordings over content in the web conference recording includes placing content from a first local recording from the first participant computing system corresponding to a time period between the first time and the second time over content in the web conference recording corresponding to the time period.

4. The method of claim 3, further comprising storing location information for content from the first participant computing system in the web conference recording, wherein the content from the first local recording is placed over the content in the web conference recording based on the location information.

5. The method of claim 1, further comprising determining the speed of the playback based on a length of the period corresponding to the connectivity issue.

6. A computer-implemented method comprising:
generating a web conference recording of a live web conference among a plurality of participant computing systems;
in response to identifying a first connectivity issue for a first participant computing system, storing a first time of identifying the first connectivity issue and associating the first time with the first participant computing system;
in response to identifying that the first connectivity issue has been resolved, storing a second time of identifying that first connectivity issue has been resolved and associating the second time with the first time and the first participant computing system;
receiving, at the end of the live web conference, one or more local recordings from one or more participant computing systems of the plurality of participant computing systems; and
merging content from the one or more local recordings into the web conference recording, the content from the one or more local recordings corresponding to one or more connectivity issues of a corresponding participant computing system during the live web conference, wherein merging content from the one or more local recordings into the web conference recording includes placing content from a first local recording from the first participant computing system corresponding to a time period between the first time and the second time over content in the web conference recording corresponding to the time period.

7. A computer-implemented method comprising:
identifying a connectivity issue for a first participant computing system during a live web conference;
in response to determining that the connectivity issue has been resolved, streaming a playback of the web conference recorded during a period corresponding to the connectivity issue to the first participant computing system until caught up to the live web conference, the playback streamed at a speed faster than normal; and
in response to the playback catching up to the live web conference, streaming the live web conference to the first participant.

8. The method of claim 7, further comprising determining the speed of the playback based on a length of the period corresponding to the connectivity issue.

* * * * *